United States Patent [19]
Sears

[11] 3,813,170
[45] May 28, 1974

[54] ALIGNMENT OF A DATUM LINE SOURCE
[75] Inventor: Edward G. Sears, Houston, Tex.
[73] Assignee: Paul J. Charrin, Houston, Tex.
[22] Filed: June 28, 1972
[21] Appl. No.: 266,972

[52] U.S. Cl............. 356/138, 350/172, 331/94.5 A
[51] Int. Cl......................... G02b 7/14, G01b 11/26
[58] Field of Search........ 33/1 T, DIG. 21; 356/138, 356/152, 172; 331/94.5 A; 350/172

[56] References Cited
UNITED STATES PATENTS

| 3,471,234 | 10/1969 | Studebaker | 356/138 |
| 3,599,336 | 8/1971 | Walsh | 356/172 UX |
| 3,646,352 | 2/1972 | Bol et al. | 356/102 |
| 3,667,849 | 6/1972 | Appler et al. | 33/DIG. 21 |
| 3,667,849 | 6/1972 | Appler et al. | 33/DIG. 21 |
| 3,471,234 | 10/1969 | Studebaker | 356/138 |
| 3,599,336 | 8/1971 | Walsh | 356/172 UX |

Primary Examiner—Ronald L. Wibert
Assistant Examiner—Paul K. Godwin
Attorney, Agent, or Firm—Mason, Kolehmainen, Rathburn & Wyss

[57] ABSTRACT

A method and means are provided for aligning a datum line source useful in performing precise surveying or construction operations relative to a predetermined reference point. The datum line source utilizes a laser beam generator and may be precisely aligned with a predetermined reference point without the aid of a plummet. A portion of a downwardly directed laser beam passes though an aperture in a reflecting surface disposed in the path of the laser beam to enable precise alignment with a predetermined reference point. The other portion of the laser beam is directed by the reflecting surface for use as a datum line.

8 Claims, 6 Drawing Figures

PATENTED MAY 28 1974

ALIGNMENT OF A DATUM LINE SOURCE

BACKGROUND OF THE INVENTION

1. Field of the Invention

The present invention relates generally to the alignment of devices for producing datum lines and, more particularly, to the alignment of a datum line source comprising a laser beam generator for use in surveying and construction operations capable of being precisely aligned with a predetermined reference point without the use of a plummet.

2. Description of the Prior Art

The use of a laser beam as a datum line in construction and surveying operations has become quite common. A properly aligned laser beam provides an extremely precise datum line over great distances.

In surveying and most construction operations, a laser beam is usually aligned with a predetermined reference point. A plummet is characteristically used to accomplish this alignment. The alignment procedure is usually quite time consuming. Further, it is not easy to detect when a laser aligned by using a plummet becomes slightly out of alignment in response to being jarred or moved.

In a patent to Studebaker, U.S. Pat. No. 3,471,234, dated Oct. 7, 1969, a device is set forth that eliminates the need for a plummet in aligning a laser beam with a known reference point. That device, however, utilized a laser beam source of the type producing two oppositely directed laser beams. That device has proven to be complex and quite unsuited for use in the rugged terrains experienced in construction and surveying operations.

SUMMARY OF THE INVENTION

An object of the present invention is the provision of a new and improved method and means for aligning a datum line source with a known reference point.

A further object of the present invention is the provision of a new and improved method and means for aligning a datum line source comprising a laser beam generator of the type producing a single downwardly directed laser beam over a predetermined reference point.

Briefly, the above and other objects of the present invention are achieved by a datum line source comprising a laser beam generator having a single downwardly directed laser beam. In a preferred embodiment, the path of the downwardly directed laser beam is interrupted by a reflecting surface. An aperture, preferrably having a configuration of a truncated right-circular cone, is provided through the body of the reflecting surface for passing a first portion of the downwardly directed laser beam. This first portion of the downwardly directed laser beam is used to align the laser beam generator over a known or predetermined reference point. A second portion of the downwardly directed laser beam is directed at a predetermined angle to the true vertical direction of the downwardly directed laser beam for use as a datum line, advantageous in surveying or construction operations. The direction of the second portion of the laser beam used as a datum line may be varied in a horizontal plane over an angle of 360°. The direction of the second portion of the laser beam may be simultaneously varied in a vertical plane about an angle that depends upon the dimensions of the lens aperture of the laser beam generator and upon the distance of the aperture in the reflecting surface from the laser beam generator lens.

BRIEF DESCRIPTION OF THE DRAWINGS

The above and other objects and advantages and novel features of the invention will appear from the following detailed description of a preferred embodiment of the invention illustrated in the accompanying drawings wherein.

DESCRIPTION OF THE PREFERRED EMBODIMENT

Figures 1, 2:
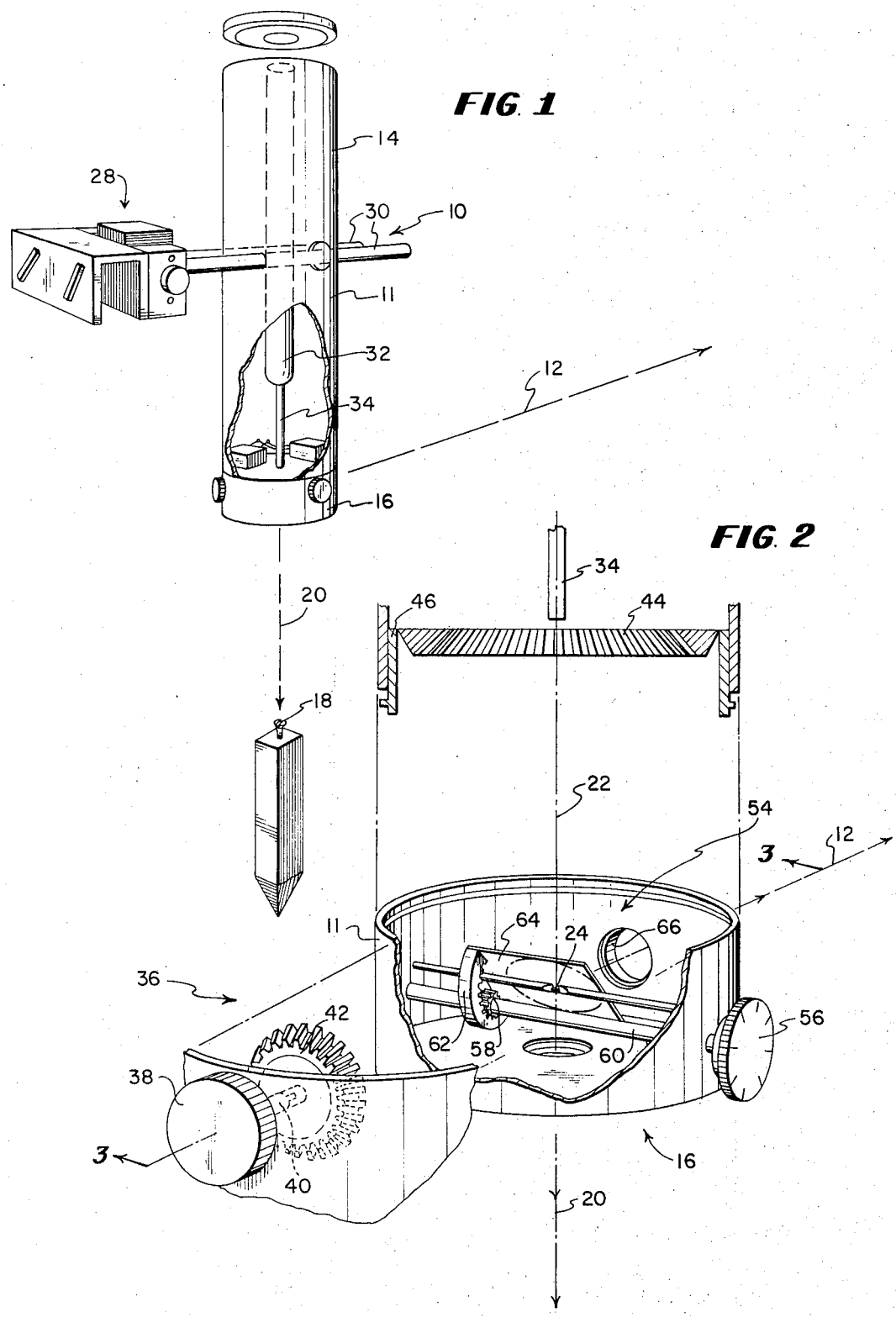
FIG. 1 is a rear perspective view of a datum line source emboding features of the present invention.
FIG. 2 is a partially sectional and partially exploded perspective view of the datum line source illustrated in FIG. 1.

Referring to the drawings and initially to FIGS. 1 and 2, there is illustrated a new and improved method and means for aligning a datum line source 10 in accordance with the principles of the present invention. The datum line source 10 comprises a laser beam generator 11 for providing a datum line in the form of a generally horizontal laser beam 12 for use advantageously in surveying and construction operations.

Figure 3:
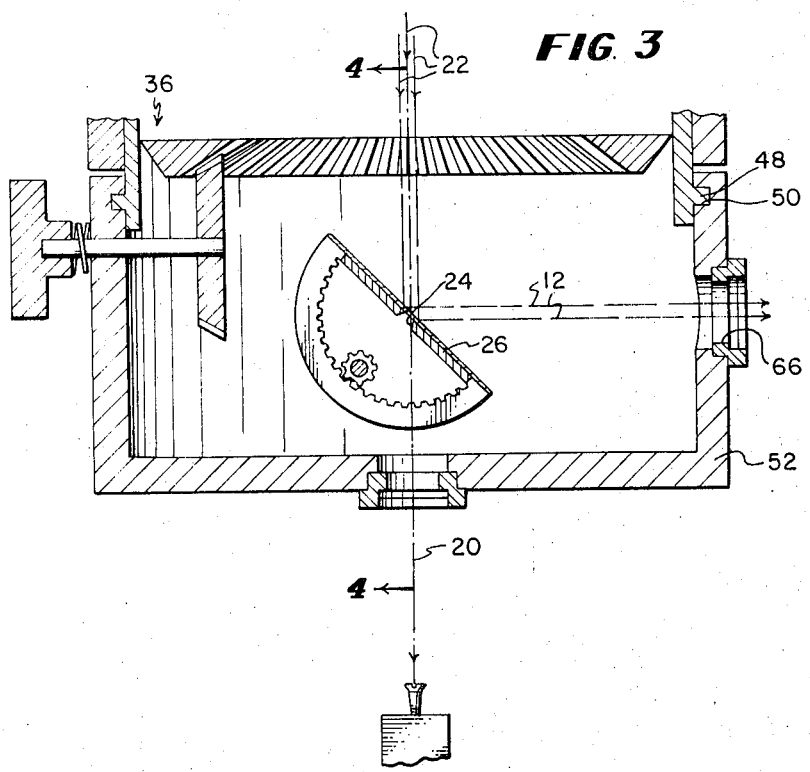
FIG. 3 is a sectional view of a portion of the datum line source taken along line 3—3 of FIG. 2.
Figure 4:
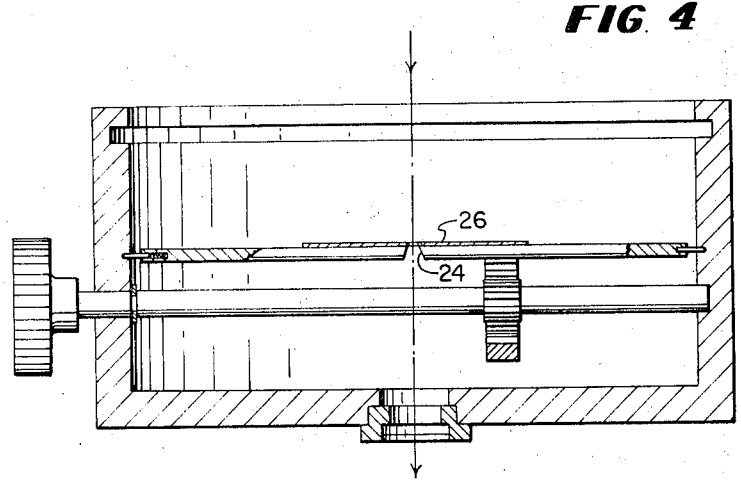
FIG. 4 is a sectional view of a portion of the datum line source taken along line 4—4 of FIG. 3.

The laser beam generator 11 basically includes an upper beam generating section 14 and a lower beam directing section 16. In accordance with an important advantage of the present invention, the laser beam generator 11 includes means for aligning itself over a predetermined reference point 18. The alignment means includes a downwardly directed portion 20 of a generated laser beam 22. The downwardly directed portion 20 is derived from the generated laser beam 22 by means of an aperture 24 in a reflecting surface 26. The aperture 24 is preferably in the form of a truncated, right-circular cone (FIGS. 3 and 4) to permit the portion 20 of the downwardly directed laser beam 22 to be transmitted through the reflecting surface 26 at any rotational position of the reflecting surface 26. The diameter of the hole formed by the aperture 24 in the reflecting surface 26 is preferably less than the diameter of the generated laser beam 22. Thus, the innermost portion of the generated laser beam 22 is caused to pass through the aperture 24 in the reflecting surface 26 to enable the laser beam generator 11 to be precisely aligned over a predetermined reference point 18 without the use of a plummet. The outermost portion 12 of the generated laser beam 22 is directed by the reflecting surface 26 in a generally horizontal direction for use advantageously as a datum line for surveying and construction operations.

For some applications, such as where the beams 12 and 20 are required to be separated by a fixed angle, for example, 90°, the apertured reflecting surface 26 may be replaced by conventional prismatic means for receiving the beam 22 and transmitting the beams 12 and 20.

In order to secure the laser beam generator 11 (FIG. 1) to a suitable support, a mounting means 28 is provided. The mounting means 28 advantageously includes leveling means in the form of bubble vails 30. Since the generated laser beam 22 is produced by a laser tube 32 through a collimator 34 and since the laser tube 32 and the collimator 34 are parallel and concentric with the central, longitudinal axis of the laser beam generator 11, leveling the laser beam generator 11 by means of the bubble vails 30 results in the portion 20 of the generated laser beam 22 being directed in a true vertical direction for producing a visible spot of light directly below the center of the generator 11. Although the collimator 34 (FIGS. 1 and 2) is illustrated as being positioned between the laser tube 32 and the reflecting surface 26 (FIG. 3), it could alternately be positioned between the reflecting surface 26 and the beam 12, in which case the collimator 34 would have to follow the position of the reflecting surface 26.

In order to properly align the generator 11 over a predetermined reference point 18, the longitudinal axis of the generator 11 is maintained in a true vertical direction by observing the leveling bubbles in the bubble vails 30; and the generator 11 is moved horizontally over the predetermined reference point 18. When the beam 20 is visible on the predetermined reference point 18, the generator 11 is precisely aligned over the reference point 18.

As an alternative to the mounting means 28 and leveling means 30, the laser beam generator 11 may be mounted on a conventional surveying tripod preferrably having leveling means integrally mounted on the head of the tripod.

During the surveying or construction operations, the operator of the laser beam generator 11 may easily maintain a constant check on the precise alignment of the generator 11 by observing the predetermined reference point 18 to determine if the beam 20 is visible on the reference point 18. A light-sensitive device, such as a photoelectric cell, may be positioned at the reference point 18 to intercept the beam 20 when the generator 11 is precisely aligned. Such a light-sensitive device could be combined with a conventional signaling circuit to provide a visible, audible or other form of indication to the operator when the device is no longer receiving the beam 20. If the beam 20 is not impinging on the reference point 18 as observed by the operator or as indicated by the aforementioned signaling circuit, the laser beam generator 11 must be realigned with respect to the reference point 18 in accordance with the procedure described above.

In accordance with a further aspect of the present invention and to provide complete flexibility in surveying and construction operations, the lower section 16 of the laser beam generator 11 may be rotated 360° about the central, longitudinal axis of the generator 11 independently of the upper section 14. The means for accomplishing the 360° rotation of the lower section 16 is generally designated as 36 (FIGS. 2 and 3) and includes a 360° traversing control knob 38, which may be manually controlled by an operator. The control knob 38 is coupled by a shaft 40 to a beveled drive pinion 42. The beveled drive pinion 42 mates with a beveled ring gear 44 that is fixedly secured to the inner surface of a cylindrical wall 46 of the upper beam generating section 14. The upper section 14 is held in place by the bubble vails 30; and the lower section 16 is slidably interfit with the upper section 14 by means of a shoulder 48 connected to the outer surface of the cylindrical wall 46 that slides in a recess 50 located in a cylindrical wall 52 of the lower section 16. Thus, as the control knob 38 is turned by an operator, the pinion 42 is driven about the fixed ring gear 44 to in turn cause the rotational displacement of the lower section 16 and thereby also the rotational displacement of the generally horizontally directed laser beam portion 12.

The reflected beam portion 12 (FIGS. 2, 3 and 4) of the generated laser beam 22 may be selectively positioned at an angle to the direction of the generated beam 22 and the transmitted beam 20 by means generally designated as 54. The means 54 includes a reflecting surface adjustment control knob 56 for rotating a drive pinion 58 through a drive shaft 60. The rotation of the drive pinion 58 causes the rotational displacement of an internally-toothed gear 62. The internally-toothed gear 62 is fixed to a planar support 64 for the reflecting surface 26. Thus, an operator may adjust the angular position of the reflecting surface 26, and thereby also adjust the angular position of the reflected beam 12 by a rotational adjustment of the control knob 56. The angle through which the reflected beam portion 12 may be adjusted depends upon the diameter of a lens aperture 66 and upon the distance of the reflecting surface 26 at the point of reflection of the generated laser beam 22 to the lens aperture 66. The control knobs 38 and 56 may be suitably calibrated to aid an operator in positioning the reflected beam portion 12 for use as a reference indicator.

Figure 5:
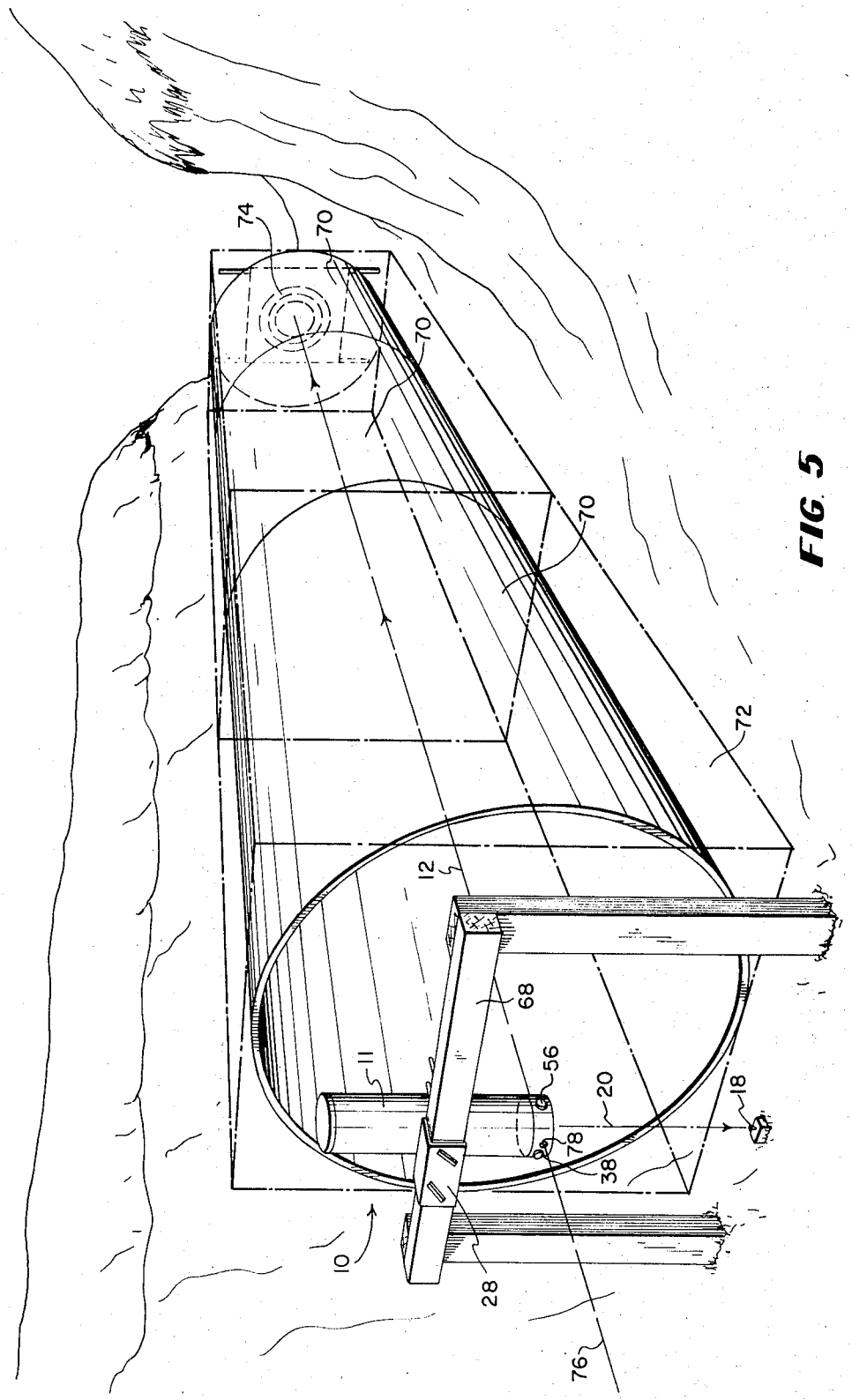
FIG. 5 is a perspective view of the datum line source being used in a construction operation.

FIG. 5 illustrates the use of a laser beam generator 11 in accordance with the principles of the instant invention as a datum line source in a pipe-laying operation. The use of a laser 11 to replace the traditional stringline has revolutionized the pipe-laying industry. In order to achieve optimum flow in a pipeline, the grade of the pipeline must be accurate. But in using the traditional stringline, the string sags and in high winds, moves about constantly, and thus enables only an estimate of the proper grade. In replacing the stringline, a laser beam, once properly aligned, becomes in effect a highly accurate, non-sagging stringline that remains uneffected by the presence of winds.

In preparation for use in a pipe-laying operation, the laser beam generator 11 is initially secured by mounting means 28 to a suitable support 68 or to the surveying tripod discussed previously.

By following the procedure described previously, the laser beam generator 11 is precisely aligned over a predetermined reference point 18. The reference beam 12 is then accurately aligned as a datum line along the desired path for the central, longitudinal axis of the pipeline by use of the horizontal and vertical control knobs 38 and 56.

The pipe sections 70 may now be laid, one at a time, on the pipe bed 72. As each pipe section is laid, the coincident alignment of its central, longitudinal axis with the reference beam 12 should be checked. This may easily be done by inserting a suitable target 74 having cross hairs for indicating the location of the central, longitudinal axis of the pipe section 70 in the end of the pipe section 70. If the target 74 is made of an opaque material, the light from the beam 12 will be visible at some point on the target. If the beam 12 does not coincide with the cross hairs on the target 74, the position of the pipe section 70 is adjusted until the beam 12 does coincide with the cross hairs on the target 74. This is usually done by adding, removing or shifting the material that constitutes the pipe bed 72.

In order to insure that the reference beam 12 corresponds to the desired direction for the central, longitudinal axis of the pipeline, the operator of the laser 11 should occasionally glance at reference point 18 to check that the beam 20 is visible over the reference point 18. Thus, a very long pipeline may be easily and quickly laid by use of the laser beam generator 11 in accordance with the principles of the instant invention.

Figure 6:
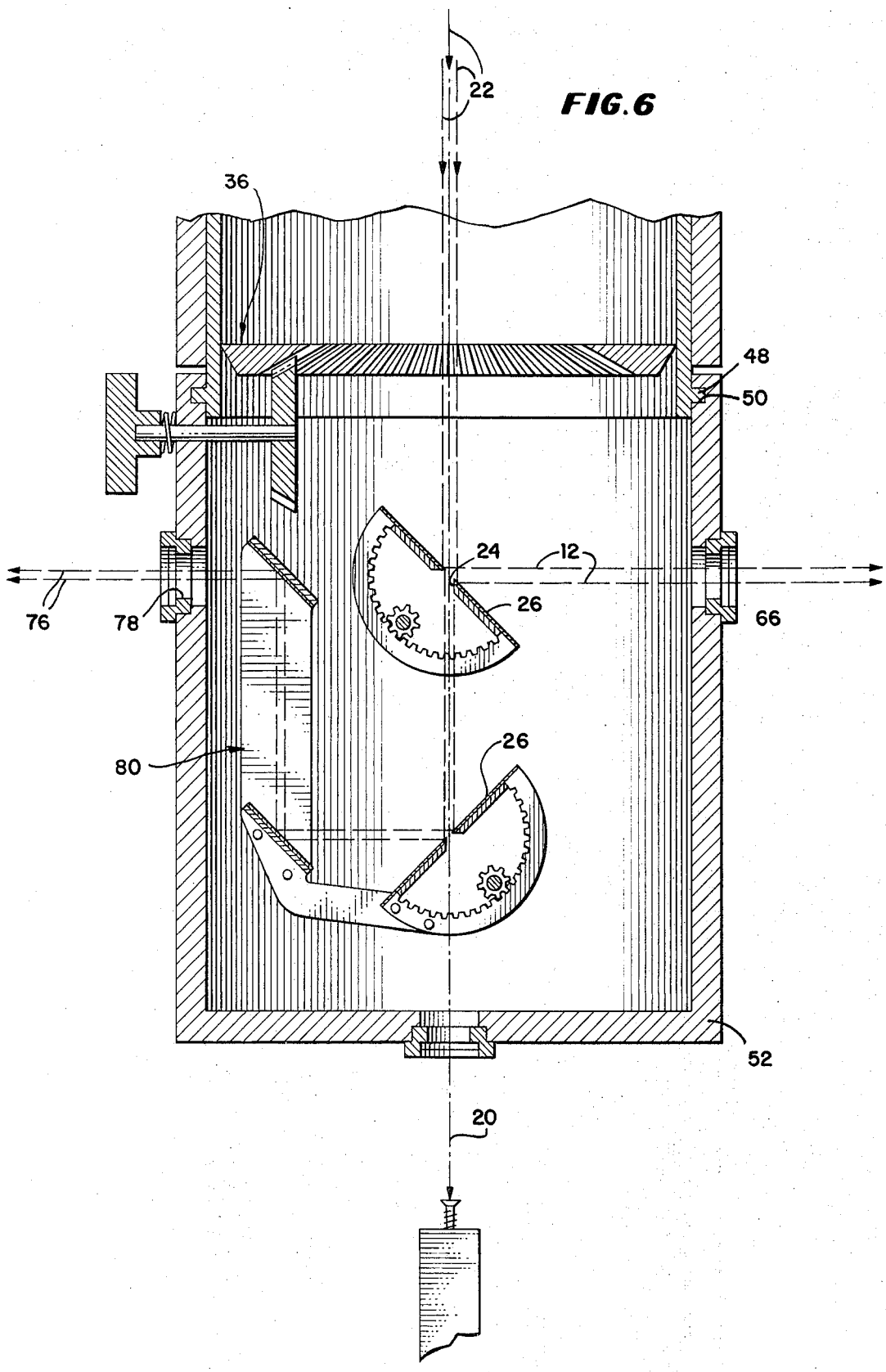
FIG. 6 is a sectional view of a portion of an alternate embodiment of the device of the present invention similar to the sectional view illustrated in FIG. 3.

In accordance with a further important feature of the present invention, the laser beam generator 11 may be used to direct a plurality of light beams for use as datum lines. Thus, a beam 76 FIGS. 5 and 6 through an aperture 78 may be used in addition to the beam 12 as a datum lime. Although the beam 76 and the aperture 78 are illustrated as being displaced from the beam 12 by 180 degrees, it is clear that practically any angular displacement between the beams 12 and 76 may be provided.

The beams 12, 20 and 76 may be obtained from the single downwardly directed beam 22 (FIG. 2) by a conventional prism assembly or by a plurality of apertured reflecting surfaces 26 (FIG. 6) stacked one on top of the other. The use of a plurality of stacked, apertured reflecting surfaces 26 would necessarily result in a vertical displacement of the outwardly directed beams. This vertical displacement could, however, be easily eliminated by any one of a number of techniques well known in the art, such as by a prism or a mirror arrangement 80. Although only two outwardly directed beams 12 and 76 are illustrated, it is obvious any other reasonable number of outwardly directed beams for use as datum lines could be provided in accordance with the principles of the present invention.

Obviously, many modifications and variations of the present invention are possible in light of the above disclosure. For example, the aperture 24 (FIG. 3) may be of any suitable configuration as long as it permits the passage of the beam 20 at any rotational position of the reflecting surface 26. Thus, it is to be understood that, within the scope of the appended claims, the invention may be practiced otherwise and as specifically described.

What is claimed as new and desired to be secured by Letters Patent of the United States is:

1. A means for aligning a datum line source comprising a source for producing a unidirectional laser beam, a housing for said source having a longitudinal axis, said housing receiving and securely retaining said source such that the laser beam is directed parallel to the longitudinal axis of the housing, means for supporting said housing, means for adjustably mounting said housing on said supporting means such that said longitudinal axis of said housing may be positioned in a true vertical position, and means for separating said unidirectional laser beam into a first substantially constant portion and a second substantially constant portion, said separating means comprising an apertured reflective surface disposed in the path of said unidirectional laser beam, said reflective surface comprising first means for directing said first portion of said laser beam in a true vertical direction such that said laser beam may be vertically aligned with a predetermined reference point, said first directing means comprising an aperture through said reflective surface having a cross-sectional area less than the cross-sectional area of said laser beam, and second means for directing said second portion of said laser beam at a predetermined angle to said true vertical direction of said first portion of said laser beam for use as a datum line, said second directing means comprising at least a portion of the surface of said reflective surface adjacent said aperture.

2. A means for aligning a datum line source comprising a source for producing a laser beam, a housing for said source having a longitudinal axis, said housing receiving and securely retaining said source such that the laser beam is directed parallel to the longitudinal axis of the housing, means for supporting said housing, means for adjustably mounting said housing on said supporting means such that said longitudinal axis of said housing may be positioned in a true vertical position, means for directing a first substantially constant portion of said laser beam in a true vertical direction such that said laser beam may be vertically aligned with a predetermined reference point and means for directing a second substantially constant portion of said laser beam at a predetermined angle to said true vertical direction of said first portion of said laser beam for use as a datum line, said means for directing said second portion of said laser beam comprising a planar reflecting surface, said laser beam having a circular transverse cross-sectional configuration and said reflecting surface including an aperture therethrough having a major dimension measured in a plane parallel to said reflecting surface of less than the diameter of said circular cross-sectional configuration of said laser beam for transmitting said first portion of said laser beam.

3. The alignment means of claim 2 wherein the configuration of said aperture comprises a truncated, right-circular cone having a central, longitudinal axis transverse to the plane of the reflecting surface.

4. A means for aligning a datum line source comprising a source for producing a unidirectional laser beam, and means for separating said unidirectional laser beam into a first substantially constant portion and a second substantially constant portion, said separating means comprising an apertured reflective surface disposed in the path of said unidirectional laser beam, said reflective surface comprising first means for directing said first portion of said laser beam in a predetermined direction such that said laser beam may be aligned with a predetermined reference point, said first directing means comprising an aperture through said reflective surface having a cross-sectional area less than the cross-sectional area of said laser beam, and second means for directing said second portion of said laser beam at a predetermined angle to said direction of said first portion of said laser beam for use as a datum line, said second directing means comprising at least a portion of the surface of said reflective surface adjacent said aperture.

5. A means for aligning a datum line source comprising a source for producing a laser beam, means for directing a first substantially constant portion of said laser beam in a predetermined direction such that said laser beam may be aligned with a predetermined reference point, and means for directing a second substantially constant portion of said laser beam at a predetermined angle to said direction of said first portion of said laser beam for use as a datum line, said means for directing said second portion of said laser beam comprising a planar, reflecting surface, said laser beam having a circular, transverse cross-sectional configuration and said reflecting surface including an aperture therethrough having a major dimension measured in a plane parallel to said reflecting surface of less than the diameter of said circular cross-sectional configuration of said laser beam for transmitting said first portion of said laser beam.

6. The alignment means of claim 5 wherein the configuration of said aperture comprises a truncated, right-circular cone having a central, longitudinal axis transverse to the plane of the reflecting surface.

7. A means for aligning a datum line source comprising a source for producing a unidirectional laser beam, and means for separating said unidirectional laser beam into a first substantially constant portion and a plurality of second substantially constant portions, said separating means comprising a plurality of vertically spaced, apertured reflective surfaces, disposed in the path of said unidirectional laser beam, each of said surfaces comprising first means for directing said first portion of said laser beam in a predetermined direction such that said laser beam may be aligned with a predetermined reference point said first directing means comprising an aperture through said reflective surface having a cross-sectional area less than the cross-sectional area of said laser beam, and second means for directing one of said plurality of second portions of said laser beam at a predetermined angle to said direction of said first portion of said laser beam for use as a datum line.

8. The method of aligning a datum line with a predetermined reference point comprising the steps of generating a unidirectional laser beam, and separating said unidirectional laser beam into first and second substantially constant portions by means of an apertured reflective surface disposed in the path of said unidirectional laser beam and having an aperture with a cross-sectional area less than the cross-sectional area of said laser beam, said separating step comprising the steps of disposing said aperture in the path of said unidirectional laser beam to thereby form said first and second portions by unimpeding one of said first and second portions and by reflecting the other of said first and second portions, directing said first portion in a predetermined direction to align said laser beam with a predetermined reference point and directing said second portion at a predetermined angle to the direction of said first portion for use as a datum line.

* * * * *